US012587967B2

(12) United States Patent
Tayyab et al.

(10) Patent No.: US 12,587,967 B2
(45) Date of Patent: Mar. 24, 2026

(54) ENERGY HARVESTING AWARE USER EQUIPMENT POWER STATE TRANSITION

(71) Applicant: Nokia Solutions and Networks Oy, Espoo (FI)

(72) Inventors: Muhammad Tayyab, Oulu (FI); Muhammad Majid Butt, Naperville, IL (US); Rapeepat Ratasuk, Naperville, IL (US); Nitin Mangalvedhe, Naperville, IL (US); Gilsoo Lee, Naperville, IL (US); Navin Hathiramani, Dallas, TX (US); Louis Madier, Les Ulis (FR)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 370 days.

(21) Appl. No.: 18/450,444

(22) Filed: Aug. 16, 2023

(65) Prior Publication Data

US 2024/0098649 A1 Mar. 21, 2024

Related U.S. Application Data

(60) Provisional application No. 63/407,969, filed on Sep. 19, 2022.

(51) Int. Cl.
*H04W 52/02* (2009.01)
(52) U.S. Cl.
CPC ............... *H04W 52/0277* (2013.01); *H04W 52/0258* (2013.01)
(58) Field of Classification Search
CPC ......... H04W 52/0277; H04W 52/0258; H04W 72/21; H04W 76/27; H04W 52/0235;
(Continued)

(56) References Cited

U.S. PATENT DOCUMENTS

| | | |
|---|---|---|
| 10,587,458 B2 | 3/2020 | Salkintzis et al. |
| 10,638,405 B2 | 4/2020 | Myhre et al. |

(Continued)

FOREIGN PATENT DOCUMENTS

| | | |
|---|---|---|
| WO | 2021/162596 A1 | 8/2021 |
| WO | 2021/221611 A1 | 11/2021 |
| WO | 2022/031972 A1 | 2/2022 |

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

(Continued)

*Primary Examiner* — Nizam U Ahmed

(74) *Attorney, Agent, or Firm* — SQUIRE PATTON BOGGS (US) LLP

(57) ABSTRACT

Systems, methods, apparatuses, and computer program products for power state transition handling for energy harvesting aware user equipment are provided. For example, a method can include monitoring an energy level and power state of a user equipment. The method can also include determining whether the energy level satisfies a power state transition criterion. The method can further include transitioning from a first power state to a second power state based on the power state transition criterion being determined to be satisfied by the energy level of the user equipment.

18 Claims, 6 Drawing Sheets

(58) Field of Classification Search
CPC .......... H04W 52/0245; H04W 52/0216; H04L 5/0053
See application file for complete search history.

(56) References Cited

U.S. PATENT DOCUMENTS

| | | | |
|---|---|---|---|
| 11,540,223 | B2 | 12/2022 | Butt et al. |
| 2015/0201342 | A1 | 7/2015 | Vannithamby |
| 2015/0380973 | A1 | 12/2015 | Scheb |
| 2016/0116925 | A1 | 4/2016 | Freeman et al. |
| 2019/0364492 | A1* | 11/2019 | Azizi ................ H04W 52/0264 |
| 2020/0315307 | A1* | 10/2020 | Foreman .................. H02J 7/02 |
| 2021/0152976 | A1 | 5/2021 | Daoura et al. |
| 2022/0070766 | A1 | 3/2022 | Haque et al. |

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.

Sultania et al., "Optimizing the Energy-Latency Tradeoff in NB-IoT With PSM and eDRX", IEEE Internet of Things Journal, vol. 8, No. 15, Aug. 1, 2021, pp. 12436-12454.

Extended European Search Report received for corresponding European Patent Application No. 23193142.9, dated Feb. 19, 2024, 7 pages.

Extended European Search Report received for corresponding European Patent Application No. 23191016.7, dated Feb. 20, 2024, 9 pages.

* cited by examiner

ENERGY HARVESTING AWARE USER EQUIPMENT POWER STATE TRANSITION

FIELD

Some example embodiments may generally relate to communications including mobile or wireless telecommunication systems, such as Long Term Evolution (LTE) or fifth generation (5G) radio access technology or new radio (NR) access technology, or other communications systems including subsequent generations of the same or similar standards. For example, certain example embodiments may generally relate to power state transition handling for energy harvesting aware user equipment.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on 5G new radio (NR), but a 5G (or NG) network can also build on the E-UTRA radio. From release 18 (Rel-18) onward, 5G is referred to as 5G advanced. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio. 6G is currently under development and may replace 5G and 5G advanced.

SUMMARY

An embodiment may be directed to an apparatus. The apparatus can include at least one processor and at least one memory storing instructions. The instructions, when executed by the at least one processor, may cause the apparatus at least to perform monitoring an energy level and power state of the apparatus. The instructions, when executed by the at least one processor, may also cause the apparatus at least to perform determining whether the energy level satisfies a power state transition criterion. The instructions, when executed by the at least one processor, may further cause the apparatus at least to perform transitioning from a first power state to a second power state based on the power state transition criterion being determined to be satisfied by the energy level of the apparatus.

An embodiment may be directed to an apparatus. The apparatus can include at least one processor and at least one memory storing instructions. The instructions, when executed by the at least one processor, may cause the apparatus at least to perform receiving a message indicating a power state transition of a user equipment based on an energy level of the user equipment. The instructions, when executed by the at least one processor, may also cause the apparatus at least to perform adjusting scheduling of the user equipment in accordance with the power state transition. The instructions, when executed by the at least one processor, may further cause the apparatus at least to perform sending paging or data to the user equipment in accordance with the adjusted scheduling.

An embodiment may be directed to a method. The method can include monitoring an energy level and power state of a user equipment. The method can also include determining whether the energy level satisfies a power state transition criterion. The method can further include transitioning from a first power state to a second power state based on the power state transition criterion being determined to be satisfied by the energy level of the user equipment.

An embodiment may be directed to a method. The method can include receiving a message indicating a power state transition of a user equipment based on an energy level of the user equipment. The method can also include adjusting scheduling of the user equipment in accordance with the power state transition. The method can further include sending paging or data to the user equipment in accordance with the adjusted scheduling.

An embodiment can be directed to an apparatus. The apparatus can include means for monitoring an energy level and power state of the apparatus. The apparatus can also include means for determining whether the energy level satisfies a power state transition criterion. The apparatus can further include means for transitioning from a first power state to a second power state based on the power state transition criterion being determined to be satisfied by the energy level of the apparatus.

An embodiment can be directed to an apparatus. The apparatus can include means for receiving a message indicating a power state transition of a user equipment based on an energy level of the user equipment. The apparatus can also include means for adjusting scheduling of the user equipment in accordance with the power state transition. The apparatus can further include means for sending paging or data to the user equipment in accordance with the adjusted scheduling.

BRIEF DESCRIPTION OF THE DRAWINGS

For proper understanding of example embodiments, reference should be made to the accompanying drawings, wherein.

DETAILED DESCRIPTION

Figure 1:
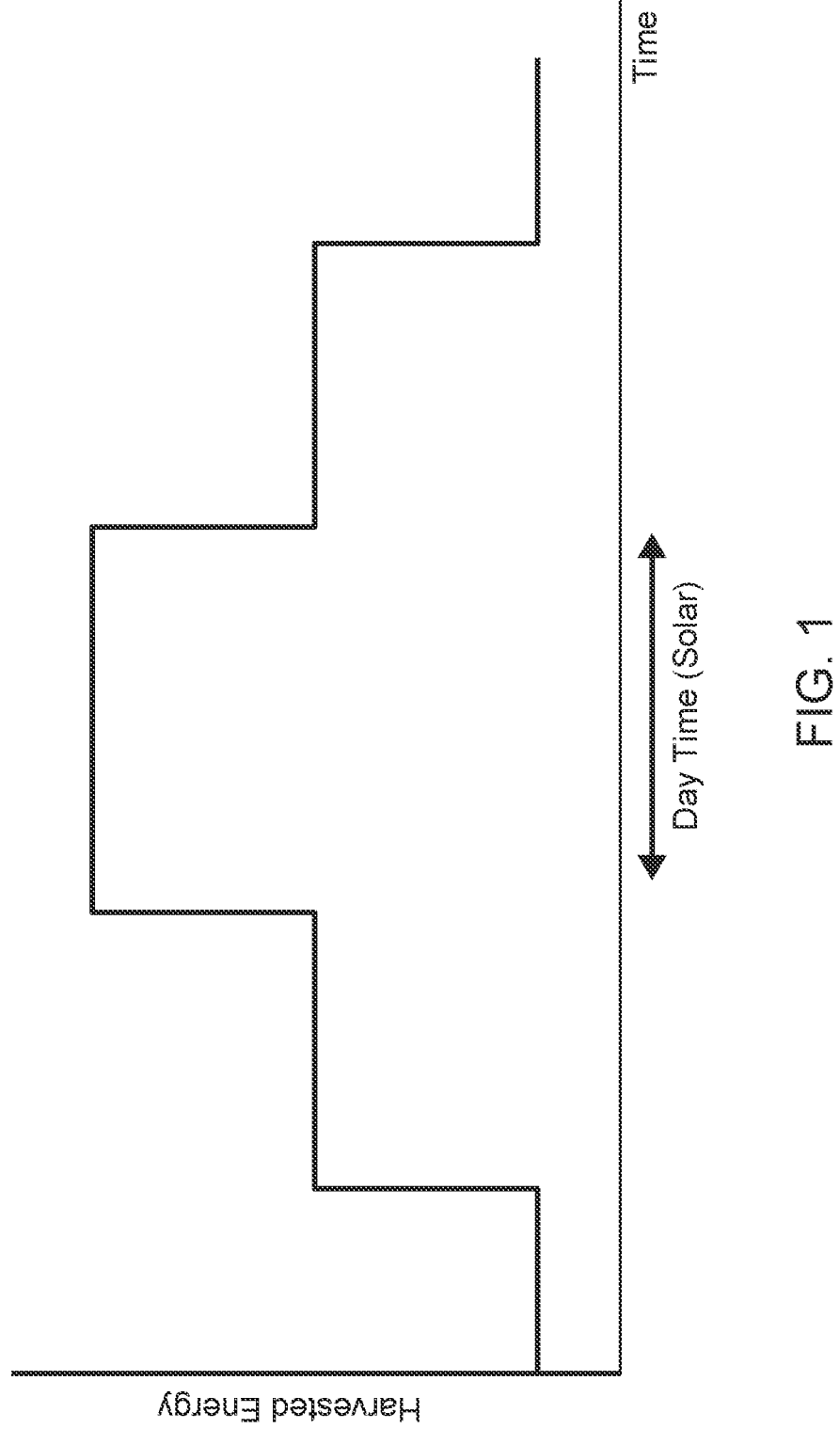
FIG. 1 illustrates solar energy harvesting over time.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing power state transition handling for energy harvesting aware user equipment, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

There may be benefit to telecommunication systems from improved coverage and increased device density with ultra-low-cost and power consumption. The coverage can include small coverage areas of, for example, 30 m indoor and up to 100 m outdoor. Radio frequency identifier (RFID) technology, while capable of meeting cost and power consumption constraints, may only have a coverage up to about 10 m. The use of passive internet of things (IoT) devices is one part of the demand. Passive IoT devices may be battery-less or may be devices that have batteries but do not need battery replacement over the lifetime of the device. Passive IoT devices may include devices with lower complexity, data rate, coverage, cost, and energy consumption than narrow band IoT (NB-IoT) and enhanced machine type communication (eMTC) devices.

Use cases for passive IoT devices include identification, tracking, monitoring, sensing, logistics, and supply chain management, transportation, manufacturing, factory automation, healthcare, energy, agriculture, transportation, smart cities, environment, extreme conditions, and hazardous environments. In some of these use cases, such as the extreme conditions and hazardous environments, it may not be practical to include batteries or and in some of these environments it may not be practical to replace batteries in installed devices.

Additionally, batteries may occupy a substantial part of a cost budget of a device that is used for such applications as identification, tracking, monitoring, sensing, or logistics. Furthermore, batteries to support such devices may significantly increase the volume of the device.

Thus, there may be many use cases where passive IoT devices may provide a useful role. Passive IoT devices may rely on an improved link budget compared to other approaches. Additionally, passive IoT devices may be designed to operate in frequency bands that can be used globally. It may be expected that a typical passive IoT device may be relatively inexpensive compared to typical NB-IoT/ eMTC devices.

Passive IoT devices may avoid the need for battery charging or replacement, which may enable low maintenance a long life cycle operation. These devices may also be ultra-low-power, such as using less than 100 micro-Watts at any time. For example, the devices may operate using back-scattering or energy harvesting. In certain embodiments, such passive IoT devices may also be referred to as ambient power-enabled IoT devices.

Goals of IoT devices may include small device size and form-factor, positioning accuracy of, for example, from 3 to 5 m, and data rate of, for example, from 10 to 100 kbps. There can be fully passive and semi-passive IoT devices. Fully passive devices may use backscattering techniques for power, while semi-passive devices may operate with energy harvesting and/or with a very small battery, such as a battery having a capacity of less than 100 mAh. Both fully passive and semi-passive IoT can be referred to as passive IoT devices Passive IoT devices may be configured for mobile originated data and mobile terminated data. For example, passive IoT devices may be configured to operate according to standards provided by the third generation partnership project (3GPP). Such passive IoT may benefit from simplified and adaptive procedures for operation with intermittently available energy and interrupted connections. Procedures may include random access (RA) procedure, radio resource control (RRC) protocol messaging, and RRC state handling. Such passive IoT devices may benefit from what is sometimes referred to as a light-weight protocol for ultra-low power consumption. In this context light-weight can refer to not being burdened with lots of messaging requirements. Such passive IoT devices can also benefit from energy neutral sustainable operation.

Passive IoT devices rely on energy harvesting. Devices that rely on energy harvesting can be referred to as energy harvesting devices (EHDs). Energy harvesting can be applicable to multiple use cases. For example, a UE can harvest and store a limited amount of energy, when available, by using light, radio frequency (RF) energy, mechanical movement, mechanical vibration including acoustic waves, and available chemical energy sources. Other energy sources are permitted.

Sensors may, for example, be powered by solar energy. This may be particularly suitable to sensors that monitor outdoors. The maximum transmission (Tx) power of such passive IoT devices may be significantly smaller due to smaller battery size or absence of battery. Such devices may be used for delay-tolerant IoT-type of traffic, such as reporting temperature, traffic conditions, wind speeds, or the like.

Lower power devices may have concerns related to the timing of energy usage and the storage of energy. For energy harvesting devices, there may be a focus on using energy when available and not necessarily on saving energy all the time. For example, there may be a low cap on energy storage, such that long periods of energy saving may not provide significant benefits over shorter periods of energy storage.

FIG. 1 illustrates solar energy harvesting over time. As shown at the left side of FIG. 1, starting around midnight, energy harvesting may be at a minimum, as only artificial light sources or weak natural light sources may be present. As the sun rises and reaches its daily apex in the sky at noon, the available energy from natural light may increase. Subsequently, as the sun heads back toward the horizon, the available natural light energy may decrease until, after sunset, only artificial light or weak natural light energy sources may be present. Thus, there may be a peak energy harvesting period centered at noon for energy harvesting devices that are reliant on solar power. There may be different patterns for devices that harvest other kinds of energy. For example, if a device relies on environmental RF energy in a home, there may be morning and evening peaks when occupants are at home and using devices that transmit RF energy. In this example, there may be a low point during the night when occupants are using less RF energy and a lowest point in the middle of the day when occupants are away from home. Many other scenarios can be imagined.

For energy harvesting devices, efficient utilization of harvested energy at the user equipment (UE) may be benefit. Efficient network procedures can provide such a benefit. FIG. 1 provides an exemplary illustration of the harvested energy over time, where different amount of energy is shown to be harvested at day time as compared to night. In such cases, device operation mode may be adjustable according to the energy harvesting possibilities expected for the device. Various power states of the UEs can be defined such that both UE and base station (BS) act while accounting for the current power state of the UE. For example, the UE and BE may allow more data-oriented services when energy is more abundant or may restrict to small data transmission, short messages, and paging when energy is less abundant.

New radio (NR) has multiple RRC states: idle, inactive, and connected state, which may be based on UE activity in terms of data transmission/reception. There may be value in defining the power states of the UE based on the harvested energy to efficiently utilize energy resources by, for example, limiting uplink (UL) or downlink (DL) data transmission rates or UE reporting when the available energy at the device side is not enough.

Certain embodiments provide an approach that relies on defining the UE and network operation mode on the basis of different power states particularly suited to ultra low power devices. In addition, certain embodiments rely on a defined transition between the states that can fully capture device operation.

Mobile initiated connection only (MICO) mode may be suitable for IoT devices that send small amounts of data and do not need to be paged. An example of this could be a smart bin, also known as a smart trashcan, which can send a message to the waste collection company indicating a current fill level, such as 50% full, 75% full, or completely full. A bin emptying lorry, or trash truck, can be scheduled to empty the bin in the next collection round. For such a device, there is no reason to page the bin as there is no mobile terminated data that would be required by the device at the bin. Alternatively, data can be transmitted to the device when the device connects to the network, such as for any configuration updates or the like.

Certain embodiments differ from MICO at least in that there is no access and mobility management function (AMF) involvement. Instead, based on the specified power states, the UE and network may determine a set of UL/DL capabilities with which the UE will be operating. In one of those states, the UE may ignore paging messages, and RAN may avoid sending the paging messages in these scenarios but the AMF may not be aware of the UE being in this state.

Prediction or other knowledge of energy arrival can help to prolong the lifetime of reduced capability (RedCap) or other types of low-cost, low-power user equipment. For example, delayed transmission for low-cost RedCap UEs may prolong lifetime of the devices in the network without recharging batteries and may save energy for the sensing part of the devices, which may also be a valuable function of the IoT networks. Joint energy harvesting and energy level-dependent data transmission/reception may allow the RedCap UEs to be sustainable while using smaller batteries. For environment monitoring use cases, uplink data may be delay tolerant and can be pushed when energy harvesting is ON. Battery storage may be used for receiving critical network data or sensing. Harvest-use-store may have an advantage over harvest-store-use because harvest-use-store does not waste energy due to battery leakage and may permit using small batteries for RedCap UEs. Smaller batteries may be lower cost batteries as well. Besides the SINR level, the energy harvesting rate may serve as a basis of selecting an MCS level for RedCap energy harvesting UEs.

Figure 2:
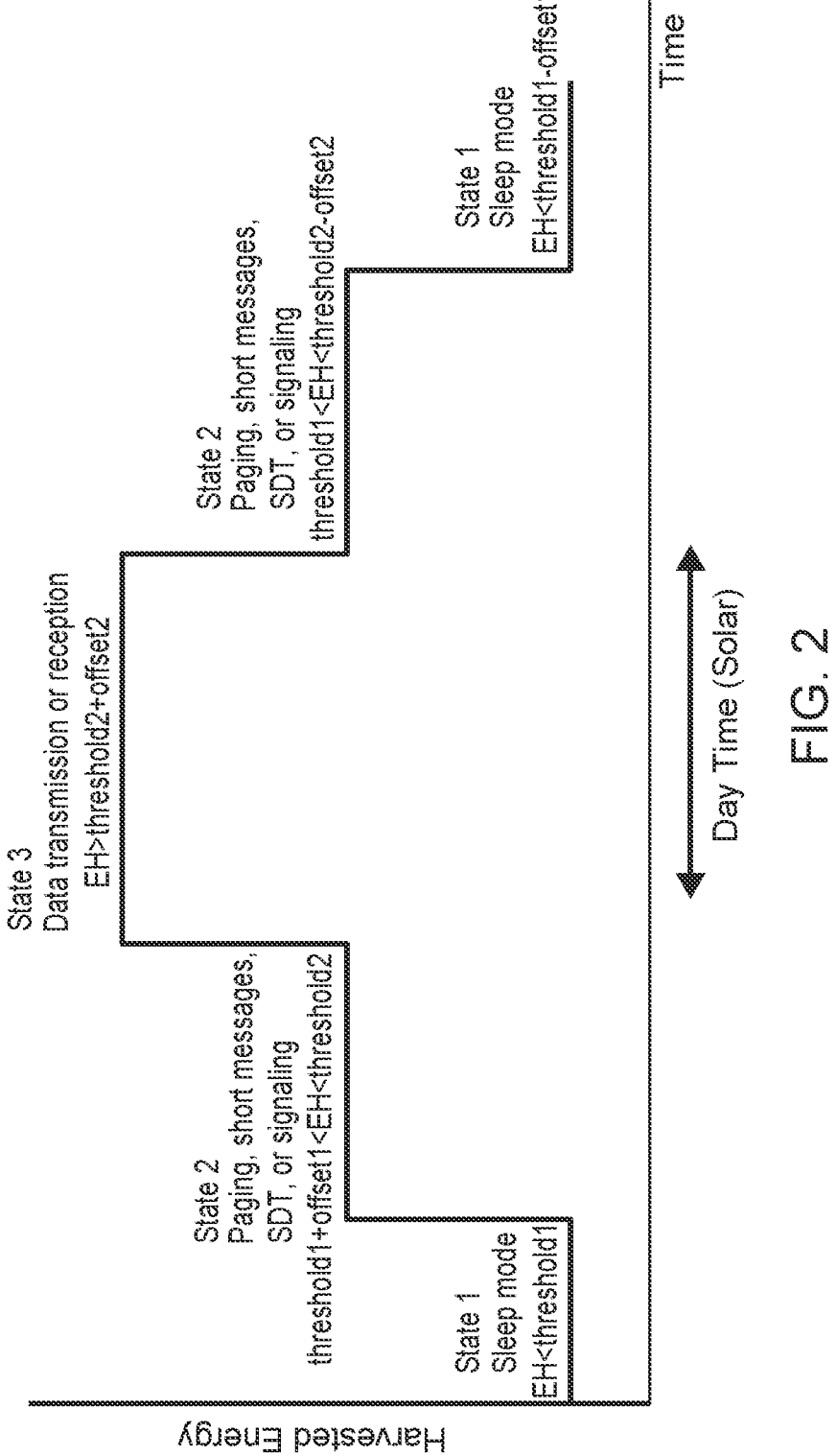
FIG. 2 illustrates power states according to certain embodiments.

FIG. 2 illustrates power states according to certain embodiments. In an RRC state functionality framework, power states may depend on UE activity rather than UE energy/power status. In certain embodiments, various nodes of a communication network may jointly consider UE power and activity states to provide efficient passive IoT UE operations, where the operations can include signaling and data transmission. Based on stored energy harvesting status of the UE, which may change rapidly due to unpredictable aspects of an energy harvesting process, UE informs the network to support its services with different levels of activity.

In certain embodiments, efficient utilization of harvested energy may be aided by reference to various defined power states of the UE and by corresponding state transition mechanisms. As shown in FIG. 2, there may be at least three power states of the UEs. FIG. 2 also shows supported operations associated with each state. The number of states and the operations of each state are examples. This does not preclude operation with a different number of states. The states are designated as 1, 2, and 3, by way of convenient reference only and not by way of preference, order, or other priority. Likewise, thresholds designated as first and second are so designated only for convenient reference.

In state 1, the UE may be in a sleep mode, which can also be referred to as a power-saving mode. This mode may be defined according to a first energy harvesting threshold, threshold 1. Thus, state 1 may be defined as being the power state when energy harvesting (EH) during a fixed interval is less than threshold 1. EH can refer to the amount of the harvested energy of the EH device in a fixed interval. In the example of FIG. 2, EH is the vertical or y-axis. EH can, for example, be regarded as the instantaneously available energy harvested/stored at the device, namely EH_stored.

Alternatively, EH can be the expected harvested energy of the device, EH_expected. The first threshold condition can determine a sleep state, in which the UE suspends all communication activity and goes to sleep. In other words, in certain embodiments, the UE's inactivity in this mode may be the result of the UE being in this mode, rather than the cause of the UE's being in this mode. For example, when it is detected that the UE's EH_stored or EH_expected is below the first threshold, the UE may consequently be in state 1, and may accordingly go inactive. Optionally, threshold 1 may be based only on EH_stored, EH_expected, or a weighted or unweighted combination thereof.

A second state, state 2, can be defined as being the power state when the harvested energy is between the first threshold and a second threshold. The threshold values can be used such that state 1 includes the first threshold value of EH or state 2 includes the first threshold value of EH. The value of the second threshold may be greater than the value of the first threshold. State 2 can be considered a limited power state. When there is limited amount harvested energy available, the EHD may support operation of procedures that require a small amount of energy, such as reception of paging, short messages, priority updates, small data transmission (SDT), and signaling. Thus, the activities in state 2 may depend on the available energy that has been or is expected to be harvested. To prevent frequent transitions between states 1 and 2, a first offset may be applied when determining whether a state transition is appropriate. For example, if the UE is already in state 1, the UE may stay in state 1 even if the EH is greater than the first threshold but less than the first threshold plus the first offset. Likewise, if the UE is already in state 2, the UE may stay in state 2 even if the EH is less than the first threshold but greater than the first threshold minus the first offset. In this example, the same offset is used for both state increment and state decrement, but different offsets could be used for the transition from state 1 to state 2 as from state 2 to state 1.

State 3 can be defined with reference to the second threshold, threshold 2. As with the transitions from state 1 to state 2 and state 2 to state 1, the transitions between state 2 and state 3 and state 3 to state 2 may further consider a second offset, which may reduce the frequency of state transitions. As mentioned above, the thresholds can be considered to be included with or outside of a given state. Thus, for example, state 2 can be defined in terms of $Th_1 < EH < Th_2$, $Th_1 \leq EH < Th_2$, $Th_1 < EH \leq Th_2$, or $Th_1 \leq EH \leq Th_2$. Likewise, state 1 can be defined in terms of $EH \leq Th_1$ or $EH < Th_2$, while state 3 can be defined in terms of $EH > Th_2$ or $EH \geq Th_2$.

When EH is above threshold 2, more energy-hungry operations may be supported such as, for example, transmission or reception of larger amounts of data.

In an example case, further state differentiation can be supported, such as adding a state 4, where state 3 can be used for mobile terminated traffic, such as a small amount of uplink transmission. State 4 can be used for mobile generated traffic, which may be a large amount of uplink transmission, such as a daily upload of sensor data.

In another example case, the number of states can be device type dependent. A higher number of power states may allow more granularity but may also involve more threshold-offset calculations.

The offsets shown in FIG. 2, offset 1 and offset 2, may help to avoid ping-pong effects, for example fast switching between power states. Examples of how the offsets and thresholds can be calculated are set forth below.

In one example case, the network can provide the reference threshold and offset values to the device with initial settings. The UE can evaluate the candidate threshold values and offset values based on channel condition, reference signal received power (RSRP), or the like, and buffer size or transmission power control (TPC) command. Then, the UE may select optimum threshold and offset values, for example, by comparing reference and candidate values of the thresholds and offsets.

Figure 3:
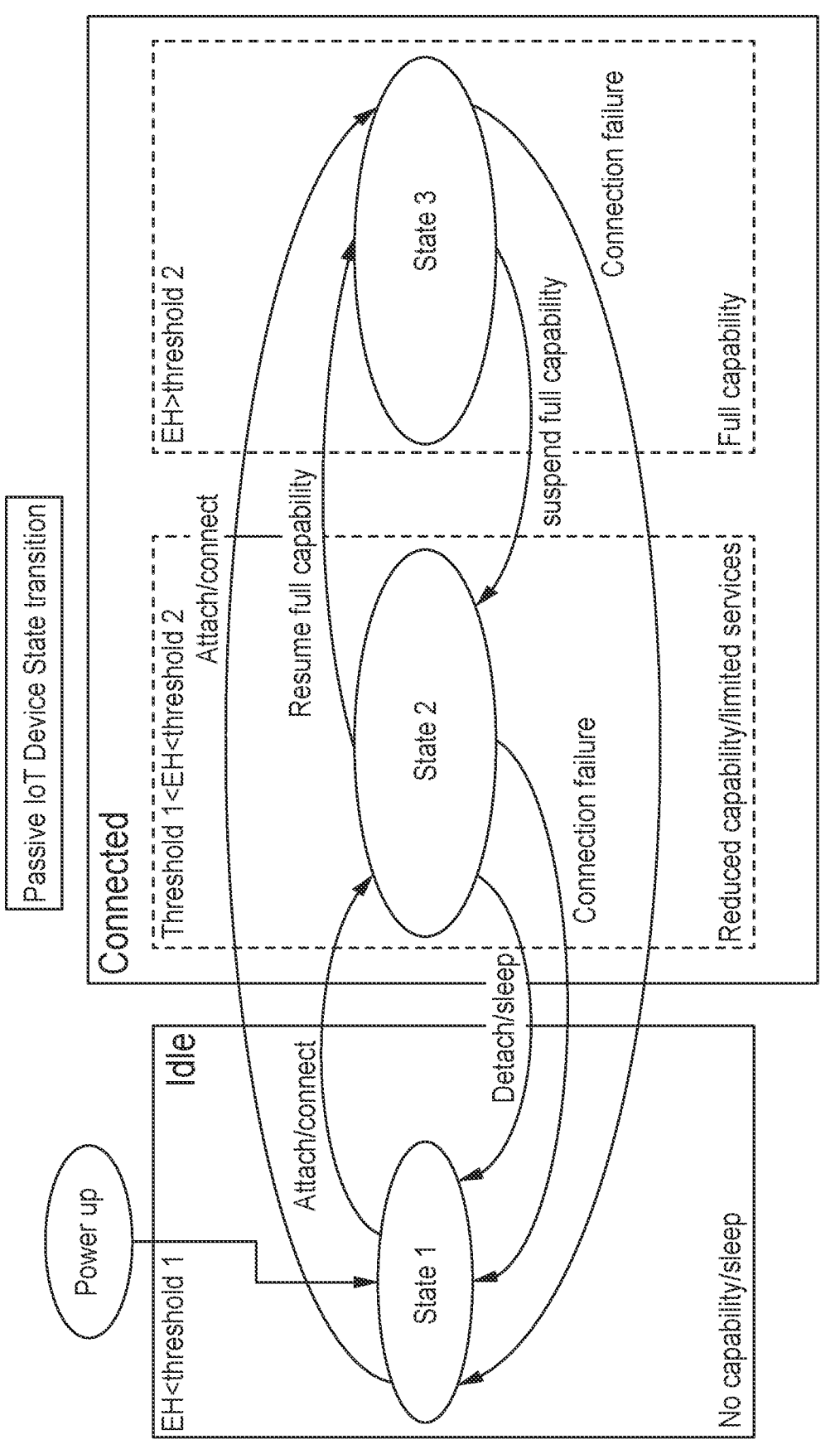
FIG. 3 illustrates power state transitions according to certain embodiments.

FIG. 3 illustrates power state transitions according to certain embodiments. The power state transitions shown in FIG. 3 can be under the control of either the UE and/or the network. For example, a given power state may be an on-demand power state.

Each power state in FIG. 3 may be mapped to an RRC state. In certain embodiments, more than one power state may be mapped to the same RRC state. The indication of a state transition may be sent by the UE to the network via scheduling request (SR)+physical uplink shared channel (PUSCH) based on an UL grant, SDT random access channel (RACH), or transmission with configured grants. The network can impose a state in case the network is congested, for example the network can put the UE on hold, without using an explicit RRC reconfiguration.

As shown in FIG. 3, the three states can be identified as no capability/sleep, reduced capability/limited services, and full capability, respectively. State 1 may be mapped to an idle state, while states 2 and 3 may be mapped to connected states.

As also shown in FIG. 3, upon power up, a UE may enter state 1 from a powered down state. When the UE is in state 1, the UE transition to either of the connected states may be referred to as an attach/connect transition. A transition from state 2 back to state 1 may be a detach/sleep transition or a connection failure transition. A connection failure can also be a cause of a transition from state 3 to state 1. Resumption of full or initiation of full capability can be achieved by transitioning from state 2 to state 3. Likewise, suspension of full capability can be achieved by transitioning from state 3 to state 2. While FIG. 3 illustrates the state transitions as passive IoT device state transitions, these device transitions may also be used by other devices that are not passive IoT devices.

Threshold 1 and threshold 2 may help to optimize device operation based on harvested energy. For example, having a large threshold 1 may imply or lead to the result that UE will be in sleep mode more and vice versa. Similarly, having a small threshold 1 but large threshold 2 may imply that UE will be in state 2 more and vice versa.

One or more offsets, such as offset 1 and offset 2, may reduce ping-pong effects between power states. Both offset values can be the same as one another or different from each other.

In an example case, ping-pong effects can be avoided by having offset 1 and offset 2 between the thresholds for upward energy level transitions and the corresponding ones for downward transitions. The offset could either be network configured or UE determined. For example, if EH>threshold2+offset2 and this condition remains satisfied for a time duration, transition from state 2 to state 3 can be configured. The time duration can be referred to as time-to-trigger the state transition.

To ensure that the UE has enough energy before switching to state 2 or 3 from a lower power state, the state transition offset can be decided based on the transmit power, for example using the channel condition of the UE and the transmit buffer size. For example, the expected duration of transmission of the buffer contents can be taken into account. For example, if path loss is large, the UE may need to use a high transmit power in states 2 and 3. Therefore, when UE measures a low RSRP, the total energy consumed in states 2 and 3 may increase. Thus, the UE may also need to increase the threshold values by setting a higher offset. The offset values may be calculated based on the RSRP and/or buffer size reported, or reportable, in a buffer status report. Alternatively, a lookup table may be used.

The state transition offset values can be determined by the UE itself. As another option, the UE can increase or decrease the thresholds according to a transmit power control command. For instance, if TPC commands to power up (i.e., more energy consumption is required in States 2 and 3), UE applies an increased offset to decide when to switch the stages.

Threshold 1, threshold 2, offset 1, and offset 2 can be configured based on whether the IoT device is battery-less or the IoT device has a battery, which can also be referred to as the device type of the IoT device.

In one example, the network can indicate the threshold and offset to the device with initial settings. As another example, the UE can control threshold and offset settings and inform the network about the settings. Alternatively, the network can configure a common assistance value for the offset so that each UE can set a customized threshold that fits the UE's circumstance. In another example, the network can configure UEs with a set of candidate values for each threshold and offset, and enable the UEs to individually select an appropriate threshold and offset from the candidate values.

Figure 4:
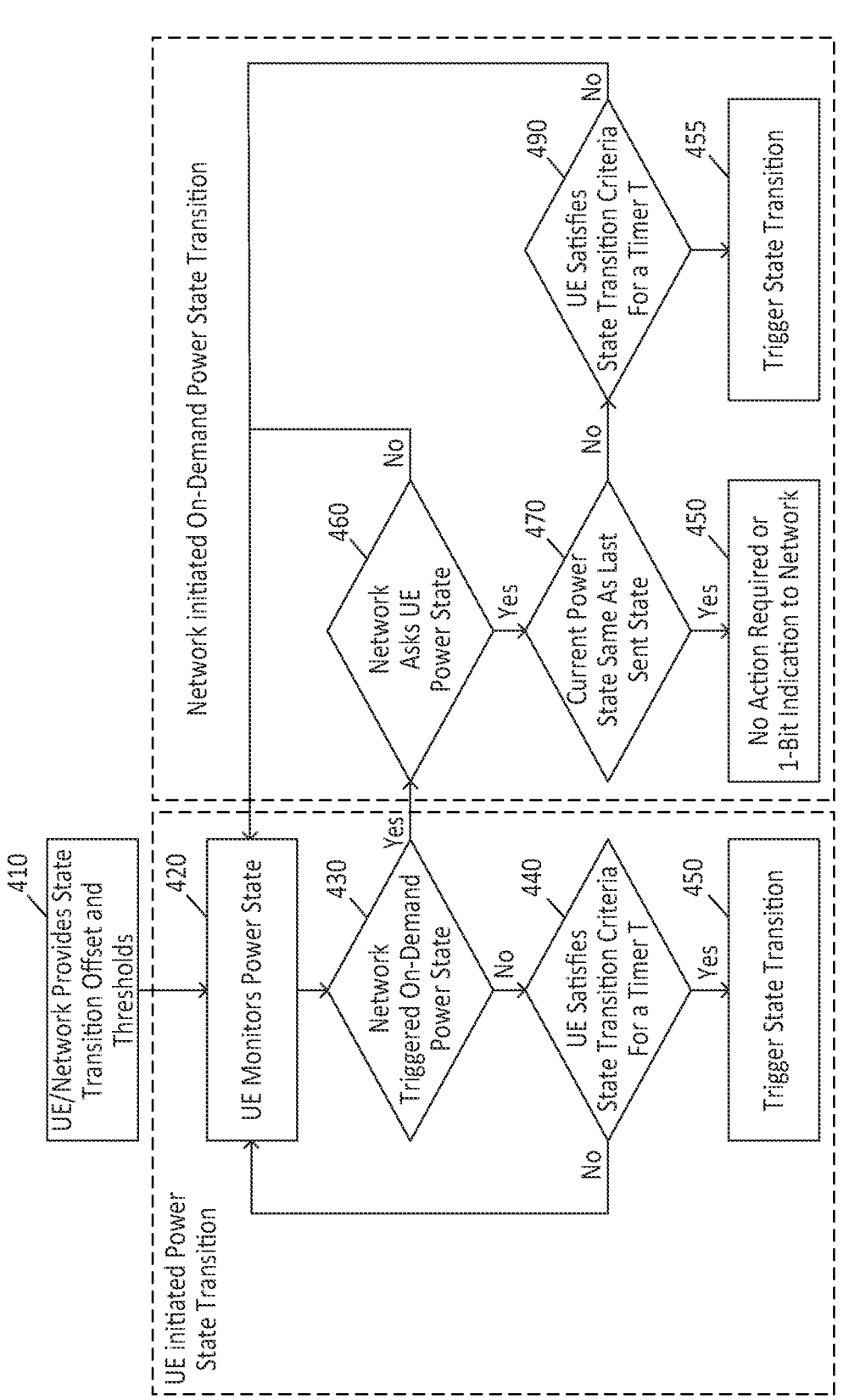
FIG. 4 illustrates a procedural flow chart of a method according to certain embodiments.

FIG. 4 illustrates a procedural flow chart of a method according to certain embodiments. The flow chart of FIG. 4 shows an approach in which both a UE controlled procedure and a network-initiated power state transition procedure are included.

At 410, state transition thresholds and offsets can be determined by the UE and/or provided by the network. In case of the UE initiated power state transition, at 420 the UE can monitor the power state based on the harvested energy. For example the criterion for a transition to state 2 to state 3 may be when EH>threshold 2+offset 2. Upon satisfying the state transition criterion at the Yes branch of 440, the UE can trigger the state transition at 450 and can send this information to the network. When the UE does not satisfy the state transition criteria for a timer T, the time-to-trigger state transition, then at the No branch from 440, the UE can proceed to 420 to monitor the power state.

Before ascertaining whether the UE satisfies the state transition criterion or criteria at 440, the UE can determine at 430 whether the network has triggered an on-demand power state (e.g., via an on-demand power state transition message) and may continue onto the No branch of 430 to 440, e.g., if there is no network triggered on-demand power state transition message indicating otherwise.

In case of the network initiated on-demand power state corresponding to the Yes branch from 430, the network at 460 can ask for the UE to enter a specified power state. The UE can check the state transition criterion at 470. In case the current state of the UE is the same as the one that was last sent to the network corresponding to the Yes branch from 470, at 480 the UE may send an indication, e.g., a one-bit indication, to the network to indicate the same configuration or simply take no action. The indication can also be referred to as an indication of non-transition, because the indication can indicate that the UE remains operating in a current power state. Otherwise, the UE can, at the No branch from 470, trigger a state transition at 455 and send the updated state information to the network. The UE may also, at 490, confirm that the UE satisfies at least one state transition criterion for a timer T before triggering the state transition at 455.

FIG. 4 illustrates three power states. As mentioned above, there can be four or more power states. The number of power states can be two, three, four, or more based on the type of the UE and/or the use case. For example, two power states may be sufficient for more data-oriented only or only SDT-related use cases, but three power states may be helpful for both more data-oriented and SDT use cases.

Figure 5A:
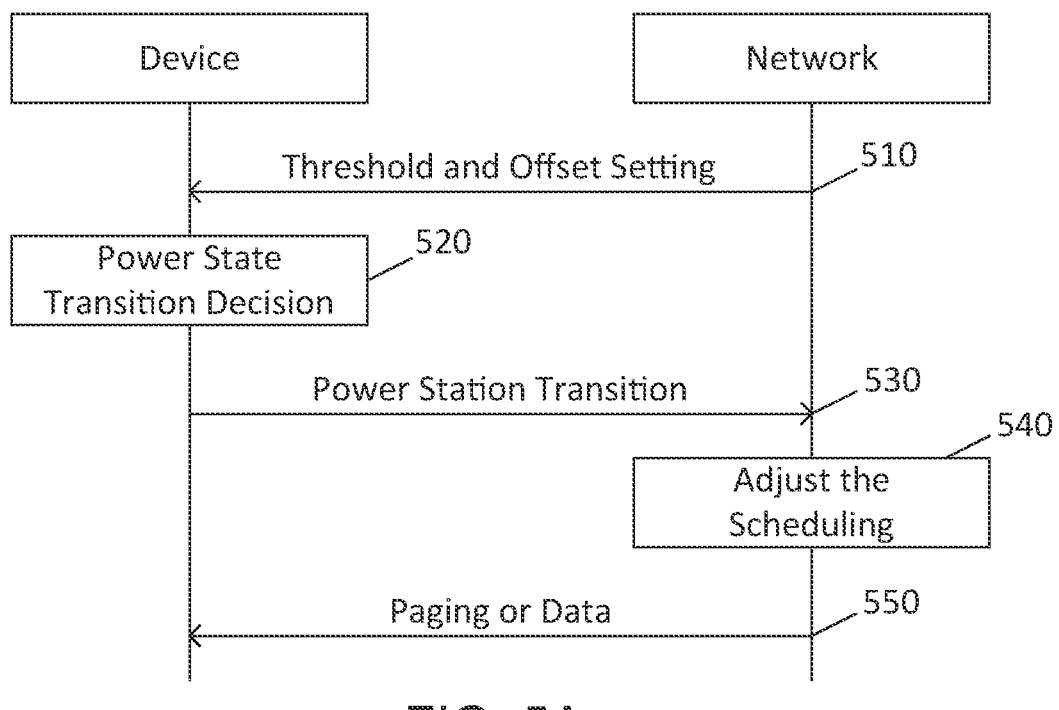
FIG. 5A illustrates a user equipment triggered state transition according to certain embodiments.

FIG. 5A illustrates a UE triggered state transition signaling diagram according to certain embodiments. As shown in FIG. 5A, a system can include a device, such as a UE, which may be an EHD, and a network element, such as a radio access node, for example a next generation Node B. The network can, at 510, provide threshold and offset settings to the device. At 520, the device can make a decision about the device's own power state based on the harvested energy over a specified time. The device can take into account the threshold and offset settings provided by the network at 510.

At 530, the device can indicate the device's power state transition to network. This power state transition indication can provide information to the network about the capability of the device, such as whether the device is limited capability, reduced capability, or full capability. In view of the power station transition message at 530, at 540 the network can adjust the scheduling for the device. In one example case, the device can be restricted to receiving certain services, such as paging, short messages, data, a combination thereof, or the like, based on the capability of the device.

Figure 5B:
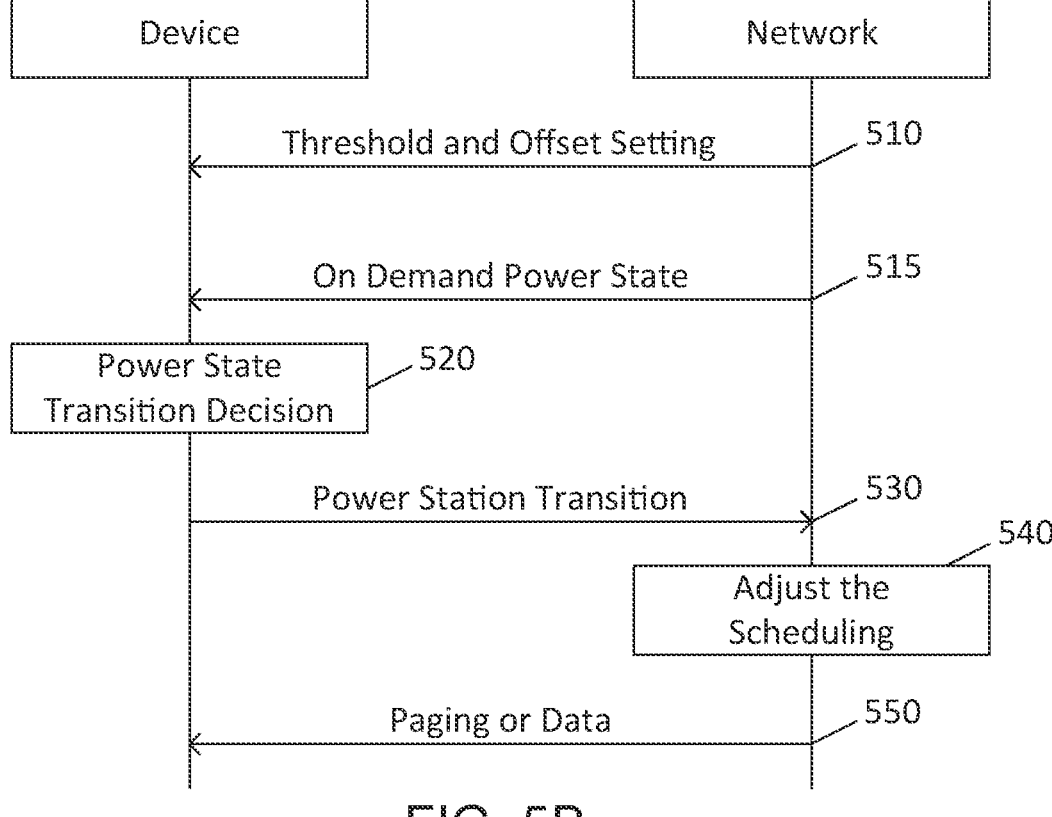
FIG. 5B illustrates an on-demand triggered state transition according to certain embodiments.

FIG. 5B illustrates an on-demand triggered state transition signaling diagram according to certain embodiments. As can be seen from a comparison between FIGS. 5A and 5B, one difference between the two approaches is that, at 515, the network can indicate an on-demand power state to the device. The on-demand power state can influence or control the power state transition decision 520.

FIG. 5B illustrates that network polling can be used to reduce power state transition signaling. While there are more total signals illustrated in FIG. 5B, the device may stop itself from sending power state transition signaling from state 1 to state 2 or vice versa when the network has explicitly or implicitly indicated that the device should remain in a current power state. The device may only send the device's power state in case the network asks, which may be referred to as on-demand power state. When the power state transition decision is left to the device itself, as illustrated in FIG. 5A, the device may need to send a signaling to the network each time the device changes the power state, thereby causing extra signaling as compared to the on-demand approach.

In certain embodiments, all state transitions can be on-demand. In this case, the decision at 520 in FIG. 5B may simply be determining that the network has requested a specific state that is different from a current state. This can be referred to as network initiated, namely that network can send an indication to the device asking for an on-demand power state.

At 540 in both FIGS. 5A and 5B The gNB schedules any DL data or paging according to the capability of the device.

Figure 6:
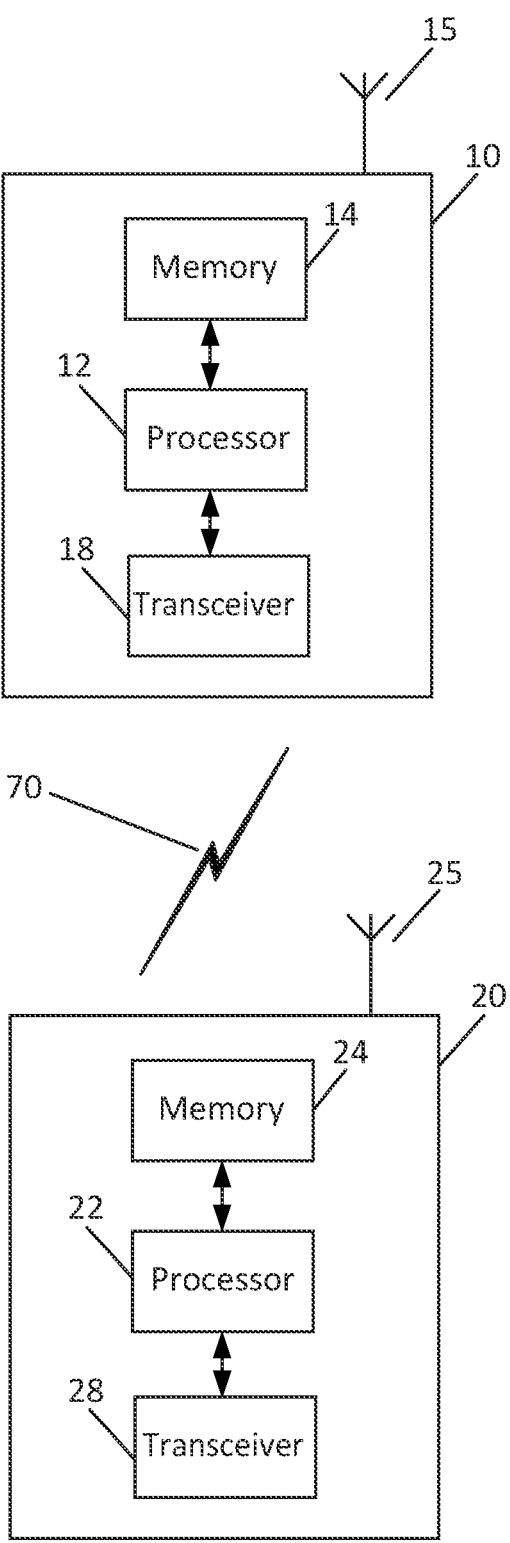
FIG. 6 illustrates an example block diagram of a system, according to an embodiment.

FIG. 6 illustrates an example of a system that includes an apparatus 10, according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may include an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a mid-haul interface, referred to as an F1 interface, and the DU(s) may have one or more radio unit (RU) connected with the DU(s) over a front-haul interface. The DU may be a logical node that includes a subset of the gNB functions, depending on the functional split option. It should be noted that one of ordinary skill in the art would understand that apparatus 10 may include components or features not shown in FIG. 6.

As illustrated in the example of FIG. 6, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to power state transition handling for energy harvesting aware user equipment.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be include any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein. The term "non-transitory," as used herein, may correspond to a limitation of the medium itself (i.e., tangible, not a signal) as opposed to a limitation on data storage persistency (e.g., RAM vs. ROM).

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5B, or any other method described herein. In some embodiments, as discussed herein, apparatus 10 may be configured to perform a procedure relating to providing power state transition handling for energy harvesting aware user equipment, for example.

FIG. 6 further illustrates an example of an apparatus 20, according to an embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6.

As illustrated in the example of FIG. 6, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can include any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDM symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-5B, or any other method described herein. For example, in an embodiment, apparatus 20 may be controlled to perform a process relating to providing power state transition handling for energy harvesting aware user equipment, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, certain embodiments may provide support for the use of power states based on harvested energy available or expected to be available rather than relying solely on power states defined by activity conducted.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

Partial Glossary

BS Base station
EH Energy harvesting
SDT Small data transmission
TPC Transmit power control
UE User equipment

We claim:

1. An apparatus, comprising:
at least one processor; and
at least one memory storing instructions that, when executed by the at least one processor, cause the apparatus at least to perform
monitoring an energy level and power state of the apparatus;
receiving an on-demand power state transition message from the network, wherein the power state transition message indicates whether the user equipment is limited capability, reduced capability, or full capability;
determining whether the energy level satisfies a power state transition criterion, wherein the determining is based on the on-demand power state transition message; and
transitioning from a first power state to a second power state based on the power state transition criterion being determined to be satisfied by the energy level of the apparatus.

2. The apparatus of claim 1, wherein the determining whether the energy level satisfies the power state transition criterion comprises determining whether the energy level satisfies the power state transition criterion for a predetermined duration.

3. The apparatus of claim 1, wherein the determining whether the energy level satisfies the power state transition criterion comprises determining whether a network has triggered an on-demand power state transition.

4. The apparatus of claim 3, wherein the instructions, when executed by the at least one processor, further cause the apparatus at least to perform
receiving at least one threshold setting from the network, wherein the determining whether the energy level satisfies the power state transition criterion uses the at least one threshold setting.

5. The apparatus of claim 3, wherein the instructions, when executed by the at least one processor, further cause the apparatus at least to perform
comparing a power state indicated in an on-demand power state transition message from the network to a current power state of the apparatus.

6. The apparatus of claim 1, wherein the determining is performed based on a configured threshold setting.

7. The apparatus of claim 6, wherein the determining is further performed based on a plurality of offset settings configured to the apparatus, wherein one of the plurality of offset settings is applied to a corresponding threshold of the at least one threshold setting during the determining when transitioning from the first power state to the second power state, and wherein another of the plurality of offset settings is applied to the corresponding threshold during the determining when transitioning from the second power state to the first power state.

8. An apparatus, comprising:
at least one processor; and
at least one memory storing instructions that, when executed by the at least one processor, cause the apparatus at least to perform sending an on-demand power state transition message to the user equipment;
receiving a message indicating a power state transition of a user equipment based on an energy level of the user equipment, wherein the message indicating the power state transition indicates whether the user equipment is limited capability, reduced capability, or full capability, and is responsive to the on-demand power state transition message;
adjusting scheduling of the user equipment in accordance with the power state transition; and
sending paging or data to the user equipment in accordance with the adjusted scheduling.

9. The apparatus of claim 8, wherein the adjusting the scheduling comprises scheduling communications corresponding to a power state of the user equipment upon the power state transition.

10. The apparatus of claim 8, wherein the instructions, when executed by the at least one processor, further cause the apparatus at least to perform
sending at least one threshold setting to the user equipment, wherein the at least one threshold setting corresponds to the power state transition.

11. The apparatus of claim 8, wherein the power state transition comprises a transition from a first power state to a second power state, the first power state and the second power state each comprising a different one of a power inactive state, a low power active state, and a full power active state.

12. A method, comprising:
monitoring an energy level and power state of a user equipment;
receiving an on-demand power state transition message from the network, wherein the power state transition message indicates whether the user equipment is limited capability, reduced capability, or full capability;
determining whether the energy level satisfies a power state transition criterion, wherein the determining is based on the on-demand power state transition message; and
transitioning from a first power state to a second power state based on the power state transition criterion being determined to be satisfied by the energy level of the user equipment.

13. The method of claim 12, wherein the determining whether the energy level satisfies the power state transition criterion comprises determining whether the energy level satisfies the power state transition criterion for a predetermined duration.

14. The method of claim 12, wherein the determining whether the energy level satisfies the power state transition criterion comprises determining whether a network has triggered an on-demand power state transition.

15. The method of claim 14, further comprising:
receiving at least one threshold setting from the network, wherein the determining whether the energy level satisfies the power state transition criterion uses the at least one threshold setting.

16. The method of claim 14, further comprising:
comparing a power state indicated in an on-demand power state transition message from the network to a current power state of the user equipment.

17. The method of claim 12, wherein the determining is performed based on a configured threshold setting.

18. The method of claim 17, wherein the determining is further performed based on a plurality of offset settings configured to the user equipment, wherein one of the plurality of offset settings is applied to a corresponding threshold of the at least one threshold setting during the determining when transitioning from the first power state to the second power state, and wherein another of the plurality of offset settings is applied to the corresponding threshold during the determining when transitioning from the second power state to the first power state.

\* \* \* \* \*